(12) United States Patent
Hue et al.

(10) Patent No.: US 7,944,362 B2
(45) Date of Patent: May 17, 2011

(54) METHOD OF DETECTING A VISIBILITY INTERFERENCE PHENOMENON FOR A VEHICLE

(75) Inventors: David Hue, Chatou (FR); Julien Rebut, Paris (FR)

(73) Assignee: Valeo Vision, Bobigny (FR)

( * ) Notice: Subject to any disclaimer, the term of this patent is extended or adjusted under 35 U.S.C. 154(b) by 360 days.

(21) Appl. No.: 12/269,254

(22) Filed: Nov. 12, 2008

(65) Prior Publication Data

US 2009/0128309 A1    May 21, 2009

(30) Foreign Application Priority Data

Nov. 16, 2007   (FR) ...................................... 07 08073

(51) Int. Cl.
    *G08B 21/00*    (2006.01)
(52) U.S. Cl. ........................ 340/602; 340/438
(58) Field of Classification Search .................. 340/438,
    340/457.2, 602, 603, 604, 425.5; 382/104,
    382/199; 324/658, 664; 250/208.1, 339.11
    See application file for complete search history.

(56) References Cited

U.S. PATENT DOCUMENTS

| 5,493,619 | A  | * | 2/1996  | Haley et al. .................. 382/199 |
| 6,728,393 | B2 | * | 4/2004  | Stam et al. .................. 382/104 |
| 7,423,752 | B2 |   | 9/2008  | Leleve et al. |
| 7,492,270 | B2 | * | 2/2009  | Veerasamy .................... 340/602 |
| 7,551,095 | B2 | * | 6/2009  | Veerasamy .................... 340/602 |
| 7,561,055 | B2 | * | 7/2009  | Veerasamy .................... 340/602 |
| 7,613,327 | B2 | * | 11/2009 | Stam et al. .................... 382/104 |
| 7,683,326 | B2 | * | 3/2010  | Stam et al. ............... 250/339.11 |
| 7,830,267 | B2 | * | 11/2010 | Veerasamy .................... 340/602 |
| 2007/0031006 | A1 |  | 2/2007  | Leleve et al. |
| 2007/0115357 | A1 | * | 5/2007 | Stein et al. .................... 348/148 |

FOREIGN PATENT DOCUMENTS

| EP | 1715456 A1 | 10/2006 |
| FR | 2847367 A1 | 5/2004 |

OTHER PUBLICATIONS

Hautiere, Nicolas et al., "Automatic Fog Detection and Estimation of Visibility Distance Through Use of an Onboard Camera"; Machine Vision and Applications, Springer-Verlag, BE, vol. 17, No. 1, Apr. 1, 2006, pp. 8-20.

* cited by examiner

*Primary Examiner* — Van T. Trieu
(74) *Attorney, Agent, or Firm* — Jacox, Meckstroth & Jenkins (57) ABSTRACT

A method of detecting a visibility interference phenomenon for a motor vehicle. The method includes the steps of: determining a region of interest (ROI) in an acquired image (I) of the environment (E) of the vehicle (V); determining a grey-level curve (CL) from the region of interest (ROI); calculating at least one tangent (TG) from at least one point of interest (PT) in the grey-level curve (CL); and determining a directing coefficient (CF) from the tangent (TG).

18 Claims, 6 Drawing Sheets

Fig. 9

METHOD OF DETECTING A VISIBILITY INTERFERENCE PHENOMENON FOR A VEHICLE

CROSS-REFERENCE TO RELATED APPLICATIONS

This application claims priority to French Application No. 0708073 filed Nov. 16, 2007, which application is incorporated herein by reference and made a part hereof.

BACKGROUND OF THE INVENTION

1. Field of the Invention

The present invention concerns a method of detecting a visibility interference phenomenon for a motor vehicle, and a detection device for implementing the method.

It finds a particular application in the field of motor vehicles.

2. Description of the Related Art

In the case of an application to a motor vehicle, a method of detecting a visibility interference phenomenon, such as fog, known from the prior art, uses a video image for detecting fog at night when the headlights are in the main-beam position so as to measure the visibility distance.

For this purpose, it uses the light halo forming an ellipse that is generated by the diffusion of the light through the layer of fog. The fog is detected according to the parameters of this ellipse and the calculation of an approximation error between the ellipse and the halo.

One method is known from the article by Nicolas Hautière et al: *"Automatic fog detection and estimation of visibility distance through use of an onboard camera"*, which appeared in the journal "Machine Vision and Application", Springer-Verlag, BE, vol 17, No 1, of 1 Apr. 2006. This article discloses the use of an onboard camera to automatically detect fog and visibility distance.

One problem with this prior art is that it does not make it possible to detect fog of medium or low density, since such fog does not generate a sufficiently visible halo to form an ellipse when it is illuminated by the headlights, the said halo consequently not being able to be used for detection of the fog.

SUMMARY OF THE INVENTION

The aim of the present invention is the detection of a visibility interference phenomenon such as fog, at night, whatever the position of the headlights, in the main-beam or dipped position, and whatever the density of the fog.

According to a first object of the invention, this aim is achieved by a process for detecting a phenomenon limiting the visibility in the surroundings of a motor vehicle and comprises the following steps:
   the emission of a light beam into the vicinity of the motor vehicle by at least one of the vehicle's headlamps;
   the determination of at least one point of interest in an image captured within the environment of the vehicle;
   the determination of an area of interest within the image;
   the determination of a graph for different levels of grey based on the area of interest; and
   the determination of an area within the graph for different levels of grey in relation to the point of interest in question
According to the invention, the method also comprises the steps of:
   calculating at least one tangent from a point of interest in the grey-level curve, this point being situated above the horizon line;
   determining a directing coefficient from the tangent; and
   deducing the presence of the phenomenon from the value of the directing coefficient determined.

As will be seen in detail below, the directing coefficient of the tangent calculated in the grey-level curve will change according to the variations in the surrounding atmosphere around the motor vehicle and in front of the vehicle and therefore according to the presence of fog that will modify this atmosphere. This directing coefficient will thus make it possible to detect fog whatever its density and whatever the position of the headlights used, in particular when the headlights are in the dipped position. In addition, such a method is simple to implement.

According to non-limitative embodiments, the method also has the following characteristics.

The method comprises a supplementary step of determining the presence of an interference phenomenon according to at least one threshold value of the directing coefficient. This makes it possible not only to detect the presence of the interference phenomenon but also to determine its density.

The method comprises a supplementary step of determining a visibility distance according to the directing coefficient determined. This makes it possible to supply subsequently a maximum driving speed in order to guarantee an optimum safety distance.

The point of interest is a point characteristic of a start of diffusion of light above the cutoff of a light beam emitted by headlights of the vehicle when the visibility interference phenomenon is present. This makes it possible to detect the presence of the interference phenomenon.

The point of interest is the origin of the grey-level curve. This makes it possible not to depend on the characteristics of the road. Moreover, this point is easy to determine.

The vehicle has an angle at the steering wheel, and the region of interest is determined in the image according to the angle at the steering wheel. This makes it possible to take into account the direction of the road on which the vehicle is moving and thus to have a homogeneous region of interest even when the road is winding According to a second object of the invention, it concerns a device for detecting a phenomenon creating an atmospheric interference so as to cause a loss of visibility for a user of a motor vehicle, comprising:
   a control unit for:
      determining a region of interest in an acquired image of the vehicle environment, the region of interest being vertical and occupying parts of the image on each side of the horizon line;
      determining a grey-level curve, taking into account only the median value of the grey levels of the pixels situated in the region of interest of the lines of the image.
   According to this second object, in addition, the control unit:
   calculates at least one tangent from a point of interest in the grey-level curve, this point being situated above the horizon line;
   determines a directing coefficient from the tangent;
   deduces the presence of the phenomenon from the value of the directing coefficient determined.

According to a third object of the invention, it concerns a computer program product containing one or more sequences of instructions able to be executed by an information processing unit, the execution of the sequence of instructions allowing implementation of the method according to any one of the preceding claims.

These and other objects and advantages of the invention will be apparent from the following description, the accompanying drawings and the appended claims.

BRIEF DESCRIPTION OF THE ACCOMPANYING DRAWINGS

Other characteristics and advantages of the present invention will be understood better with the help of the non-limitative description and drawings, among which.

DETAILED DESCRIPTION OF NON-LIMITATIVE EMBODIMENTS OF THE INVENTION

Figure 1:
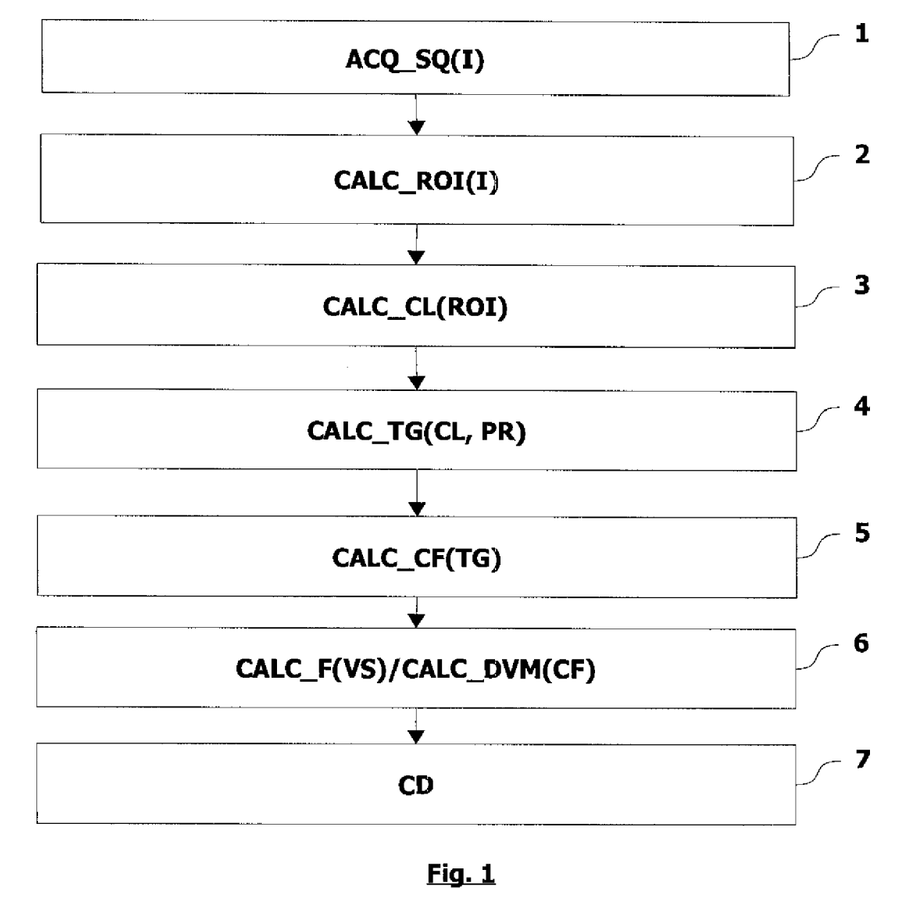
FIG. 1 depicts a diagram of a non-limitative embodiment of the detection method according to the invention.

The method of detecting a visibility interference phenomenon according to the invention is described in a non-limitative embodiment in FIG. 1.

In this application, detection takes place using a detection device installed in a vehicle V, the vehicle comprising in particular:
  headlights PJ (FIG. 9), and
  a video camera CAM, described below.

In the remainder of the description, a visibility interference phenomenon F such as fog is taken as a non-limitative example. In addition, in the remainder of the description, the headlights PJ of the vehicle V in dipped position are taken as a non-limitative example.

Naturally the method can apply to other visibility interference phenomena, that is to say any phenomenon F that creates an atmospheric interference so as to cause a loss of visibility for a user of the vehicle V, such as heavy rain or water splashes (referred to as Gischt in German or Spray in English) generated by vehicles ahead of the vehicle V in question.

As will be seen in detail below, the directing coefficient of a tangent calculated from a point of interest in a grey-level curve of an acquired image I is used to determine the presence of the fog F. This is based on the fact that this directing coefficient changes in the same way as the visibility distance DVM.

The detection method comprises the following steps as illustrated in FIG. 1:
  determining a region of interest ROI in an acquired image I of the environment of the vehicle V (step CALC_ROI (I)) at block 2;
  determining a grey-level curve CL from the region of interest ROI ((step CALC_CL(ROI)) at block 3;
  calculating at least one tangent TG from a point of interest PT in the grey-level curve CL (step CALC_TG(CL, PR)) at block 4; and
  determining a direction coefficient CF from the tangent TG (step CALC_CF(TD)) at block 5.

In a non-limitative embodiment, it also comprises a supplementary step of:
  determining the presence of fog F according to at least one threshold value VS of the directing coefficient CF (step CALC_F(VS)) at block 6.

In a non-limitative embodiment, it also comprises a supplementary step of:
  determining a visibility distance DVM according to the determined directing coefficient CF (step CALC_DVM (CF)) at block 6.

It should be noted that these two embodiments can be combined together.

In a non-limitative embodiment, it also comprises a step of:
  acquiring at least one image I by means of a camera CAM (step ACQ_SQ(I)) at block 1.

It should be noted that this step of acquiring an image I may not be included in the method described but may form part of another method executed upstream of the method described.

The steps are described in detail below.

In a first step 1), at least one image I is acquired by means of the camera CAM (FIG. 9) of the vehicle V.

The video camera CAM being placed, in the example taken, in front of the vehicle V, the acquired image I corresponds to the environment E of the vehicle V situated in the field of the camera CAM and therefore in front of the vehicle V. An interference phenomenon F such as fog situated in front of the vehicle V will therefore be detected.

The light issuing from a light beam FX emitted from one of the headlights PJ (FIG. 9) is diffused in the presence of particles of fog F in suspension in the atmosphere. The wavelength of this light beam being compatible with the analysis spectrum of the camera CAM, and the particles constituting the fog F being situated in the field of vision of the camera CAM, it is then possible to capture an image including the light diffused in the fog F.

Figure 2:
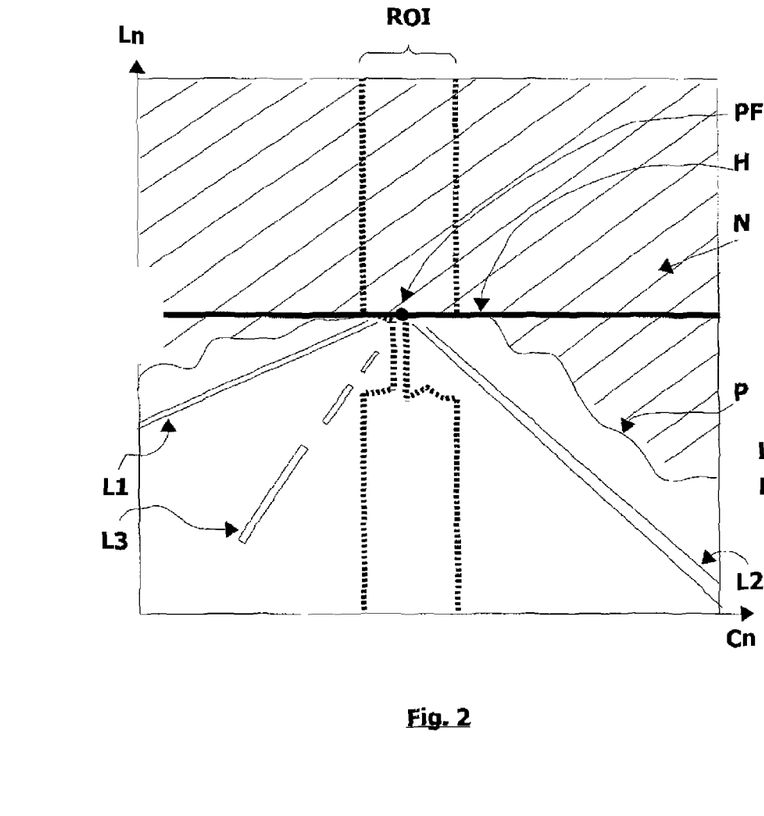
FIG. 2 is a schematic representation of an image of the environment of a vehicle acquired by the method of FIG. 1 in the absence of fog.
Figure 3:
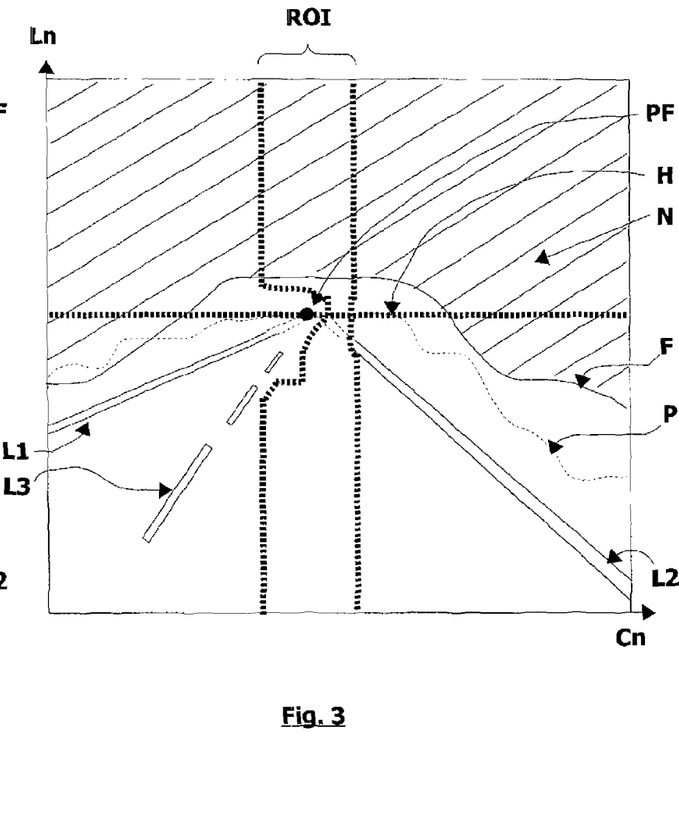
FIG. 3 is a schematic representation of an image of the environment of a vehicle acquired by the method of FIG. 1 in the presence of fog.

FIG. 2 shows a schematic example of an image I acquired at night in the absence of fog F, while FIG. 3 shows a schematic example of an image I acquired at night in the presence of fog F. On the X-axis of an image I there are shown the columns Cn of this image I, whilst on the Y-axis the lines Ln of this image I are shown.

These images I give an outline of the light diffused at night with a light beam FX from headlights PJ.

The white part represents the light diffused at night with the light beam FX, while the diagonally hatched part denoted N represents the environment E, here at the front of the vehicle V, in the field of the camera CAM not illuminated by the light beam FX.

In the two figures FIG. 2 and FIG. 3, the following can be seen:
  a road on which the vehicle V is travelling, represented by the two marking lines on the ground L1 and L2, and the one in the middle L3;
  a landscape P bordering the road; and
  the horizon line H.

In FIG. 3, the landscape P bordering the road is shown in dotted lines since it is masked by the fog F shown schematically. The same applies for the horizon line H.

In a second step 2), a region of interest ROI in the image I is determined.

In non-limitative examples the region of interest ROI may be:
- a vertical straight line passing through a reference point PR in the image I,
- determined in the vicinity of the reference point PR by a surface situated on each side of the reference point as illustrated in FIG. 2 and FIG. 3 by dotted lines.

In a non-limitative embodiment, the reference point PR is the vanishing point PF as illustrated in FIG. 2 and FIG. 3.

In a variant of this embodiment, the vanishing point PF is centered on the acquired image I. Thus, for an example of an image I of format 640*480, its abscissa PFx is situated at 320 pixels, its ordinate PFy is on the horizon line H. This is the case where the optical axis of the camera CAM is parallel to the direction of the vehicle V.

A region of interest ROI according to the second example embodiment is determined as follows, in a non-limitative embodiment:
- in a first step, the contours in the image I are determined so as to remove the non-homogeneous zones in the image I. In non-limitative examples, contour detection methods (referred to as "edge methods" in English) such as the Sobel, Prewitt, Roberts, Zero-cross, Canny etc methods can be used;
- in a second step, the region of interest ROI is determined starting from the horizon line H and using an algorithm for region increase towards the top and bottom of the acquired image I, well known to persons skilled in the art. It should be noted that, in order to determine the horizon line H, it can in non-limitative examples be determined from a calculation of the vanishing point PF in the image I issuing from the intersection of the trace of the white lines L1 and L2 on the road, or be determined from attitude sensors.

The determination of the horizon line H in an image being known to persons skilled in the art, it is not described in detail here.

Thus, a homogeneous region of interest ROI is obtained in which the following are excluded:
- noise, parasitics, and
- non-homogeneous objects such as vehicles, or white lines on the road such as the line L3, as illustrated in FIG. 2 and FIG. 3.

In a non-limitative embodiment, in order to have a homogeneous region ROI even when the road is winding, in addition the region of interest ROI is determined in the image I according to the angle at the steering wheel a of the vehicle V.

In a first non-limitative variant embodiment:
- the region of interest ROI is centered with respect to the reference point PR (seen previously) in the image I, when the angle at the steering wheel α is zero; and
- the region of interest ROI is offset laterally with respect to the reference point PR in the image I, when the angle at the steering wheel α is not zero. In a non-limitative example, the region of interest ROI is offset by three times the angle at the steering wheel α.

Thus, when the angle at the steering wheel α is positive, the region of interest ROI is offset to the right of the image I, while when the angle at the steering wheel α is negative the region of interest ROI is offset to the left on the image I. For example, if the angle at the steering wheel α is equal to 10°, the region of interest ROI is offset by 30 pixels to the right with respect to the reference point PR and is therefore centered on a new reference point of 320+30 pixels.

In a second non-limitative variant embodiment:
- the region of interest ROI is centered with respect to the reference point PR (seen previously) in the image I, when the angle at the steering wheel α is less than or equal to 15° in absolute value; and
- the region of interest ROI is offset laterally with respect to the reference point PR in the image I when the angle at the steering wheel α is greater than 15° in absolute value. In a non-limitative example, the region of interest ROI is offset by three times the angle at the steering wheel α. This threshold of 15° is characteristic of a road that is winding. When the angle at the steering wheel α is less than 15° in absolute value, in general the road is in a straight line but it is the driver of the vehicle V who is not driving straight.

Thus, when the angle at the steering wheel α is greater than +15°, the region of interest ROI is offset to the right in the image I (the direction of the road goes towards the right), while when the angle at the steering wheel α is less than −15°, the region of interest ROI is offset to the left in the image I (the direction of the road goes towards the left).

For example, if the angle at the steering wheel α is equal to 18°, the region of interest ROI is offset by 54 pixels to the left with respect to the reference point PR and is therefore centered on a new reference point of 320−54 pixels.

Thus, determining the position of the region of interest ROI (and more particularly its position with respect to the X-axis) in the acquired image I as a function of the angle at the steering wheel a makes it possible to take into account the direction of the road and thus avoid obstacles such as slopes, trees, etc situated facing the vehicle when the road is winding. The region of interest ROI is thus more homogeneous.

In a third step 3) a grey-level curve CL is determined from the region of interest ROI.

The advantage is that the presence of fog F will modify the form of the grey-level curve so that, by analyzing this curve, it will be possible to determine the presence of fog F.

In a non-limitative embodiment, this grey-level curve CL (FIGS. 4 and 5) is determined as follows. For each line Ln of the acquired image I, only the pixels of the region of interest ROI are taken into account and a combination of pixels Px is applied so as to obtain a value GR for each line, this value GR being for example a grey-level value in the case of a video image (as described below).

In a non-limitative example embodiment, the combination is the median value of the grey level of each pixel Px of the line Ln in question. The advantage of the median is to estimate the mean value of the grey levels whilst dispensing with problems of noise in the image I.

Figure 4:
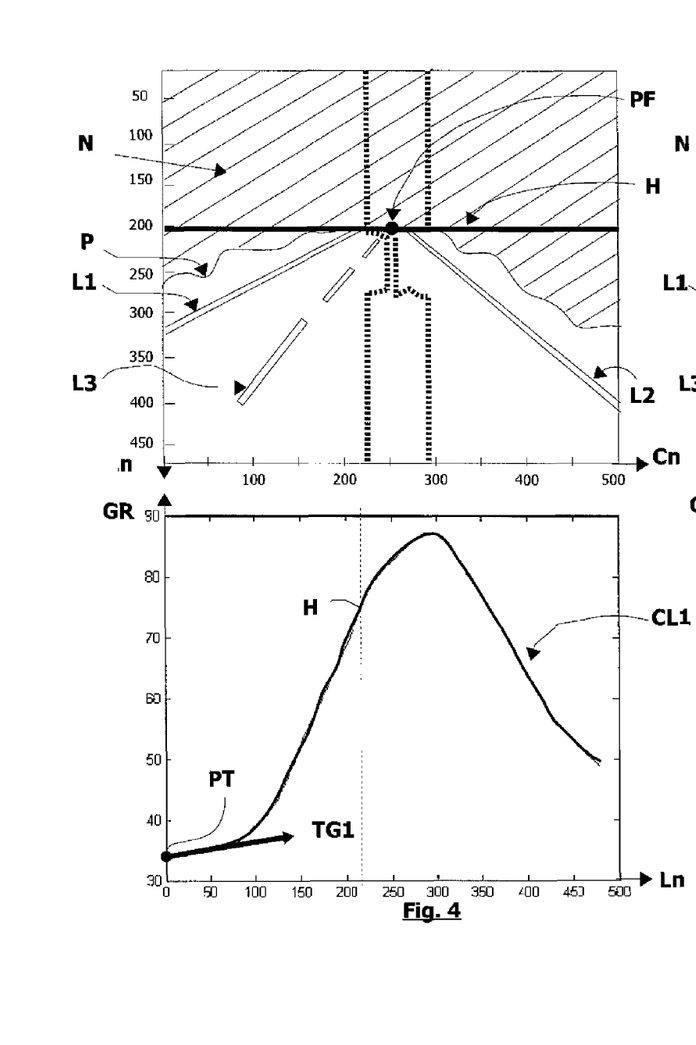
FIG. 4 depicts the image in FIG. 2 and an associated grey-level curve.
Figure 5:
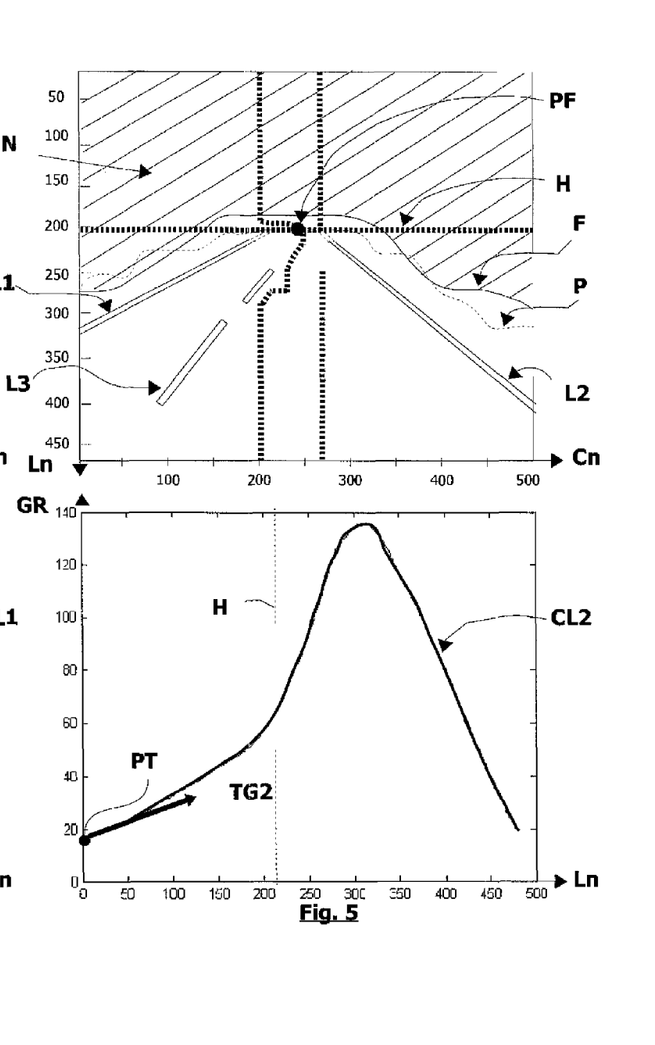
FIG. 5 depicts the image in FIG. 3 and an associated grey-level curve.

A first example of a grey-level curve CL1 is illustrated in FIG. 4 in the case where there is no fog F, and the second example of a grey-level curve CL2 is illustrated in FIG. 5 in the case where fog F exists.

As can be seen, for a grey-level curve CL, on the X-axis the line number Ln is indicated in the acquired image I, while on the Y-axis the grey-level value GR attributed is indicated.

On these two grey-level curves CL1 and CL2, the horizon line H has also been placed, which is situated approximately at the abscissa 220.

Figure 6:
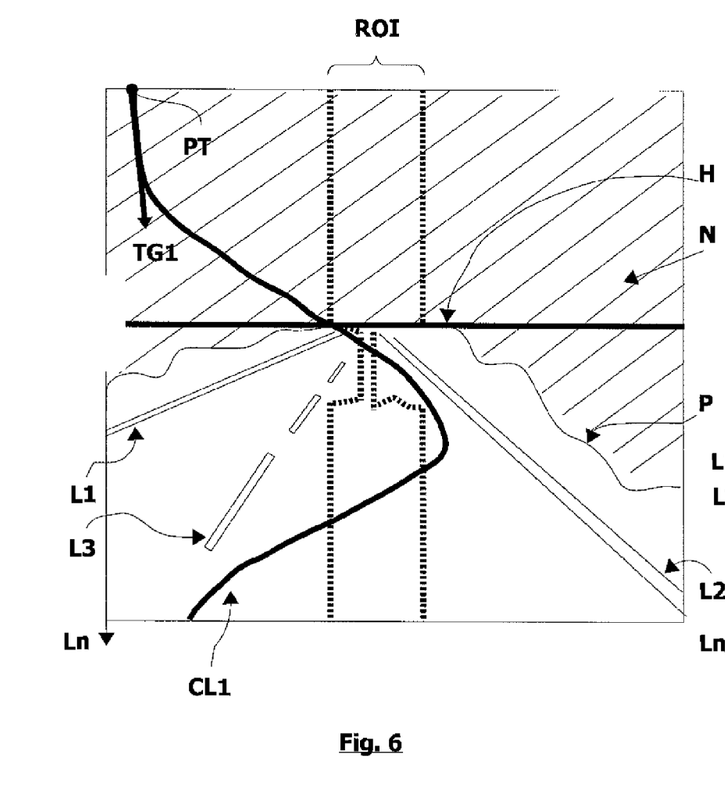
FIG. 6 depicts the image in FIG. 2 on which the grey-level curve in FIG. 4 is superimposed.
Figure 7:
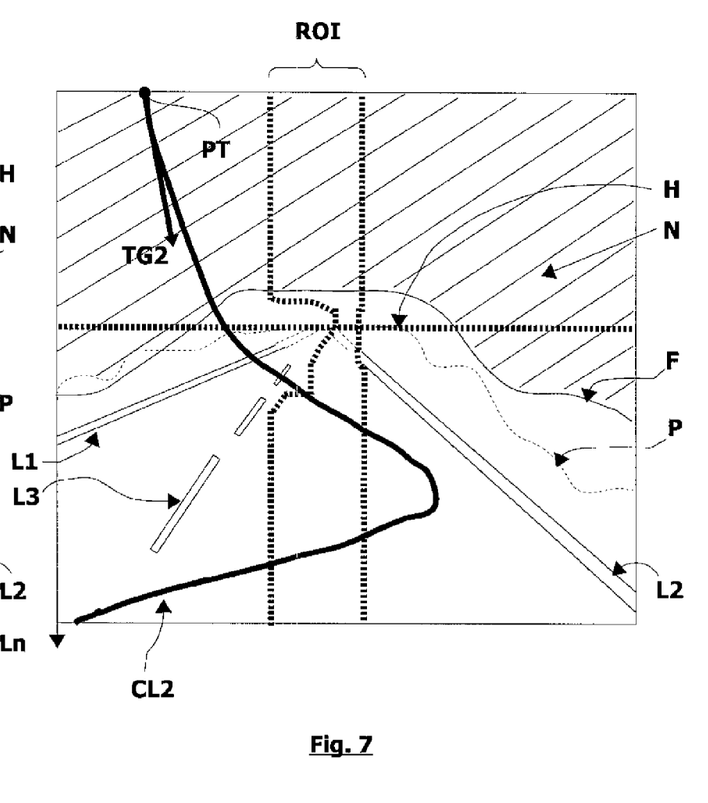
FIG. 7 depicts the image in FIG. 3 on which the grey-level curve in FIG. 5 is superimposed.

As can be seen in FIGS. 6 and 7, the grey-level curves CL1 and CL2 associated respectively with the acquired images I in the absence of fog F and in the presence of fog F are superimposed on the associated images I (they have been tilted through 90° with respect to the preceding FIGS. 4 and 5).

It should be noted that, in the case where the integration time of the camera CAM is known, a grey-level curve CL may, in non-limitative embodiments, be either a luminance curve or a luminosity curve.

It will be recalled that the integration time of the camera CAM corresponds to the time of exposure to light of the camera sensors.

In a fourth step 4), at least one tangent TG is calculated from a point of interest PT in the grey-level curve CL.

In a non-limitative embodiment, the point of interest PT is a characteristic point of a start of diffusion of light above the cutoff of a light beam FX emitted by headlights PJ of the vehicle V in the presence of fog F.

This is because, in the presence of fog F, the grey-level curve CL2 will vary significantly from this point of interest PT compared with the reference curve CL1 without fog F.

This is based on the fact that, in the absence of fog F, there is no diffusion of light above the cutoff of the light beam FX emitted by the headlights PJ, whereas such does exist in the presence of fog F, this diffusion being in fact due to the reflection of the light beam FX from the headlights PJ on the fog particles F. It should be stated that the cutoff of the light beam FX is of the order of −1% below the horizon line.

In a variant embodiment of this mode, the point of interest PT is situated above the horizontal line H of the acquired image I. This makes it possible to be independent of the characteristics of the road (ground, wet road etc) and in general terms of the road scene (tree, slope). This is because the top part of the image I situated above this line H is less dependent on the road scene.

In a non-limitative example of this variant, the point of interest PT is the origin of the curve. This is because the point at the origin of the grey-level curve CL is situated above the horizon line H as illustrated in FIG. 7.

The advantage of this example is that there is no diffusion of light above the horizon line H, due to the lighting of the headlights, in the absence of fog F, whereas such does exist in the presence of fog F as seen previously.

The analysis of the grey-level curve, and in particular of the directing coefficient passing through the tangent at this point of interest, will make it possible to emphasize this light distribution.

In a fifth step 5), the directing coefficient CF, also referred to as the slope, is determined from the tangent TG.

As will be seen in detail below, the directing coefficient CF is characteristic of a change in the environment of the atmosphere around the vehicle V. In addition, from this directing coefficient CF, it will be possible to calculate a visibility distance DVM.

Thus the directing coefficient CF will make it possible to note the presence of fog and to deduce its density, either directly by means of threshold values or by means of the visibility distance DVM as described below.

In a sixth step 6), the presence of fog F and its density is determined.

In a first embodiment, the presence of fog F and its density is determined according to several threshold values VS of the directing coefficient CF.

As will be seen, by analyzing the directing coefficient CF, it will be possible to determine the presence of fog F and its density.

More particularly, the presence of fog is determined according to a threshold value VS. For example, this value is 0.15 for the non-limitative example taken of the headlights in the dipped position.

This is because, when fog F exists, it can be remarked that the directing coefficient CF of the tangent TG of the grey-level curve CL has a significant gradient (FIG. 5) compared with the one where fog F is absent (FIG. 4).

Thus, with regard to the presence of fog F, when the directing coefficient CF is greater than or equal to a first threshold VS1, the presence of fog F is deduced therefrom. In a non-limitative embodiment, this first threshold VS1 is equal to 0.15.

Below this threshold, the fog F is not perceptible in the image I.

In addition, it can also be remarked that, when fog exists, the denser the fog F, the more the directing coefficient CF increases.

It will thus also be possible to determine the density of fog F by means of the directing coefficient CF.

For this purpose two other thresholds VS2 and VS3 are used, each corresponding respectively to a mean and high density of fog F.

In a non-limitative embodiment:
the first threshold VS1=0.15 (between this threshold and the second threshold VS2, it is deduced therefrom that the fog is sparse);
the second threshold VS2=0.46 (between this threshold and the third threshold VS3, its is deduced from this that the fog is moderately dense); and
the third threshold VS3=0.77 (beyond this threshold it is deduced therefrom that the fog is very dense).

It should be noted that the density of the fog F is a function of a visibility distance DVM.

Thus, when the fog F is of:
low density, the corresponding visibility distance DVM is situated beyond 100 meters (between 100 and 150 meters for example),
moderate density, the corresponding visibility distance DVM is situated between 60 meters and 100 meters, and
high density, the corresponding visibility distance DVM is less than 60 meters.

In a second embodiment, the presence of fog F and it density are determined as a function of a visibility distance DVM, the latter being determined as a function of a directing coefficient CF.

In a non-limitative embodiment, the relationship between the visibility distance DVM and the directing coefficient CF is equal to:

$$DVM = 61.5 - 5.75*CF \qquad [1]$$

It should be noted that, in this case, this relationship [1] does not depend on the type of bitumen, the quality of the road or any other characteristic of the road as described previously.

In addition, this relationship [1] is independent of the pitch of the vehicle V (the pitch due to braking or acceleration), since it does not depend on the horizon line H.

This is because, when such pitch exists, the point of interest PT determined is solely translated into the acquired image I with respect to the previous image without pitch (upwards when the vehicle is braking, and downwards when the vehicle is accelerating).

There is therefore no need to take account of this pitch in calculating the visibility distance DVM.

Naturally other coefficients can be used.

Figure 8:
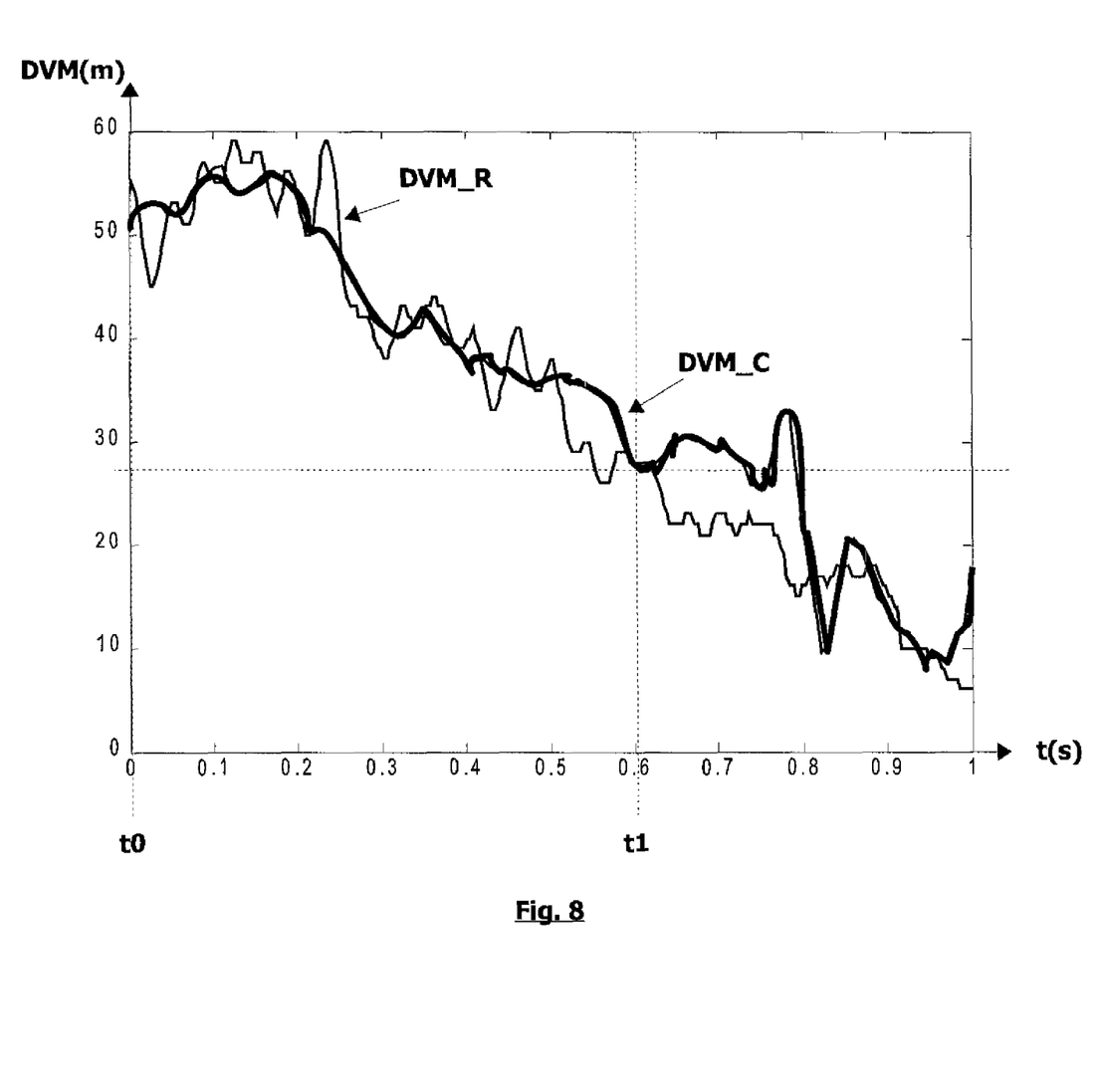
FIG. 8 illustrates a variation as a function of time of a visibility distance as a function of a directing coefficient of a tangent issuing from a grey-level curve such as the one illustrated in FIG. 5, and a visibility distance as a function of empirical data acquired.

FIG. 8 illustrates a non-limitative example of variations in the visibility distance DVM (on the Y-axis in meters) as a function of time (on the X-axis in seconds).

The first curve DVM_R concerns empirical data on the visibility distance recorded over time during real tests.

The second curve DVM_C concerns the visibility distance DVM calculated according to relationship [1] overtime.

It will be noted that the second curve DVM_C is very close to the first curve DVM_R. Thus the calculation of the visibility distance as a function of the directing coefficient CF according to relationship [1] is a reliable indicator that gives reliable values of the visibility distance DVM with respect to the real visibility distance.

Moreover, it can be seen that the visibility distance DVM decreases over time. Thus a layer of fog of low density was entered at t0=0 (CF=0.15 and DVM=50.25) and the fog F becomes moderately dense after approximately t1=0.6 seconds (CF=0.46 and DVM=27).

According to the visibility distance DVM thus calculated, it is thus also possible to deduce therefrom the presence of fog F and its density.

Thus in a non-limitative example when the visibility distance is below 150 meters, it is possible to deduce therefrom that fog F exists.

Moreover, with regard to density, when the visibility distance is below 60 meters, it is possible to deduce from this that the fog F is of high density, while when it is greater than 60 meters and beyond, it is possible to deduce from this that fog F is of moderate (60-100 meters) to low density (100-150 meters).

In addition, calculation of the visibility distance DVM makes it possible to subsequently supply to the driver of the vehicle V information on the maximum speed Vmax not to be exceeded in order not to be in danger, and thus to guarantee an optimum safety distance. In a non-limitative example, for a speed of 90 km/h, it is known that the stopping distance is approximately 80 meters.

Naturally it is also possible to combine these two embodiments (use of the thresholds VS and calculation of the visibility distance DVM) in order to refine the detection of fog F and the calculation of its density, either in parallel or one after the other.

In a seventh step 7), after fog F has been detected and its density determined, a suitable processing CD in real time on the vehicle V can be carried out.

In non-limitative examples, it may be a case of:
automatically adapting the lighting of the headlights PJ of the vehicle V by increasing the intensity of the dipped or main-beam headlights PJ (for example in order better to display the white lines on the road) and/or by switching on the fog lights (front and rear); or
to send an alert signal to the driver of the vehicle V so that he himself increases the intensity of the headlights PJ for example if he can do this to illuminate more or so that he himself switches on fog lights; or
to automatically switch on the headlights PJ from dipped to main beam or vice versa; or
to automatically limit the speed of the vehicle to a maximum authorized speed Vmax in this case; or
to send an alert signal to the driver of the vehicle so that he reduces his speed according to a maximum authorized speed etc.

According to the density of the fog F, in non-limitative examples, it is possible to determine:
a threshold for switching on the fog lights for a given visibility distance DVM; and
a threshold for automatic switching of the headlights PJ from dipped to main beam for a visibility distance DVM greater than or equal to a given threshold; or
a threshold for automatic switching of the headlights PJ from main beam to dipped for a visibility DVM less than a given threshold etc.

It should be noted that these various thresholds can be defined in non-limitative examples according to existing regulations or according to a manufacturer standard.

It should be noted that this seventh step is carried out along with the processing of the video images I by the method described above.

Thus the suitable processing CD, such as for example the automatic adaptation of the lighting of the headlights PJ in dipped or main beam mode, is executed in real time since it is carried out after each detection of an interference phenomenon F, a detection being carried at each acquisition of an image I.

Figure 9:
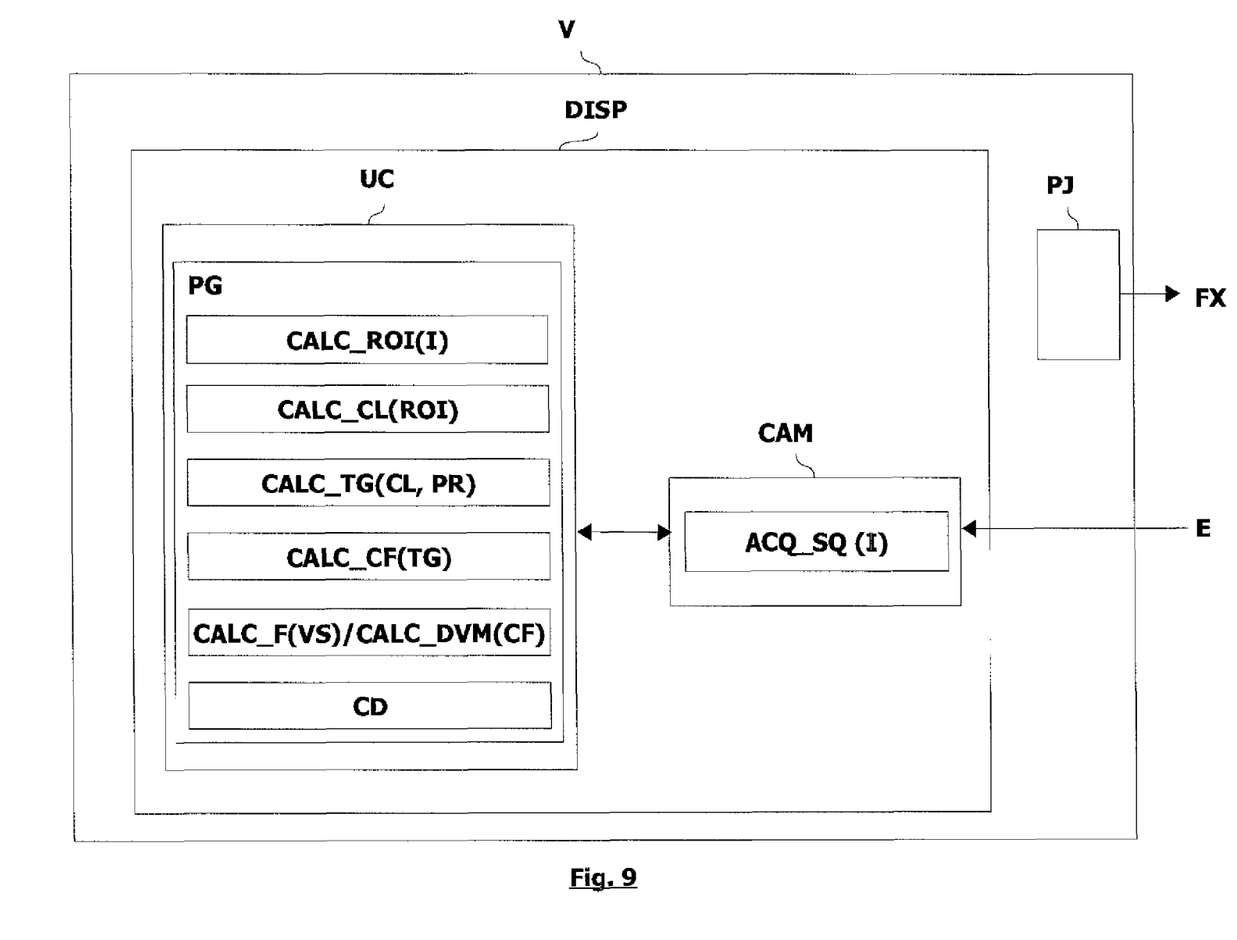
FIG. 9 illustrates a non-limitative embodiment of a device implementing the method of FIG. 1.

The method of the invention is implemented by a detection device DISP shown in FIG. 9.

This device DISP is integrated in the vehicle V. This device DISP comprises in particular:
a control unit UC for:
determining a region of interest ROI in an acquired image I of the environment E of the vehicle V;
determining a grey-level curve CL from the region of interest ROI;
calculating at least one tangent from a point of interest PT in the grey-level curve CL; and
determining a directing coefficient CF from the tangent TG.

The control unit UC also makes it possible to control the headlight PJ and the camera CM and to control (automatic adaptation of the lighting of the headlights PJ in dipped or main-beam mode, automatic switching on of the fog lights) or to carry out (sending of an alert signal) the appropriate processing CD.

In a non-limitative embodiment, the detection device DISP can also comprise the video camera CAM for acquiring an image I as illustrated in FIG. 9. It should be noted that in this case the control unit UC can also be situated in the video camera CAM.

The camera CAM is in a non-limitative example placed behind the windscreen of the vehicle V. In another non-limitative example, the camera CAM is placed close to one of the headlights PJ of the vehicle V.

It is for example of the VGA type of definition 640*480 (that is to say an acquired image I of 8 bits (per pixel) and 640 columns and 480 lines) and comprises a lens (not shown) for this purpose. The image I thus acquired is in full resolution.

To each pixel PX there is attributed a specific value GR called the grey-level value following the processing operations used in the camera (management of the integration time, of the response curve of the camera, gain etc). This grey-level value can be expressed in different formats, for example in 8 bit, 12 bit or other.

For example, the grey level of the 8-bit pixel may have a value of between 0 and 255, while the grey level of the 12-bit pixel may have a value between 0 and 4095.

In an non-limitative example, the video camera CAM acquires 10 images per second.

Naturally a camera of a different type and with a different resolution may be used.

Naturally the camera CAM that is used for the functionality of detection of fog F may also be used for other known functionalities such as:
the detection of lines for making on the ground (making it possible to avoid unintentional crossing of the lines),
automatic switching of the headlights from main beam to dipped or vice versa when a vehicle appears in front of the vehicle in question (making it possible to avoid dazzling the vehicle in front), etc.

It should be noted that all the steps of the method described above are carried out for one of more (sequence SQ) images I acquired by the video camera CAM, and this in real time. That is to say all the steps take no more than 1/10 second in the example of a sequence of 10 images per second acquired by the camera CAM. The method is therefore very rapid to execute.

It should be noted that the implementation of the detection method disclosed above may be effected by means of a software microprogrammed device and hardware hard-wired logic and/or electronic components.

Thus the detection device DISP can comprise a computer program product PG comprising one or more sequences of instructions executable by an information processing unit such as a microprocessor, or a processing unit of a microcontroller, an ASIC, a computer, etc, the execution of the sequences of instructions allowing implementation of the method described.

Such a computer program product PG can be entered in a rewritable non-volatile memory of the ROM type or in rewritable volatile memory of the EEPROM or FLASH type. The computer program PG can be entered in memory in the factory or loaded into memory or downloaded remotely into memory. The sequences of instructions may be sequences of machine instructions, or sequences of a control language interpreted by the processing unit at the time of their execution.

In the non-limitative example in FIG. 9, the computer program PG is entered in a memory of the control unit UC of the device DISP.

Naturally the description of the method is not limited to the embodiments and examples described above.

Thus the example described above for the headlights PJ in dipped position is not limitative, and the same principle can be applied for headlights PJ in the main-beam position with visibility distances DVM ranging from 0 to beyond 150 meters (the headlights in main-beam position illuminating more than in dipped position), and with a similar relationship [1].

In addition, it is very easily possible to use the method described with a rear camera and rear infrared lights (not visible to the human eye so as not to dazzle the driver of a following vehicle) in order to carry out suitable processing CD such as for example switching on the fog lights.

Moreover, if the region of interest ROI determined is not sufficiently homogeneous, it is possible not to use it and to await the determination of the region of interest ROI on the following acquired image I.

Moreover, although the example of a single tangent and a single directing coefficient has been taken, it is also possible to use several tangents and several associated directing coefficients in order to verify the fog measurement and make it reliable.

Finally, it can naturally be applied to different applications of the motor vehicle application described, for example it is possible to envisage fog detection by fixed equipment, for example close to a motorway, and to use the result of the positive detection in order to activate alert signals (also fixed, for example on the gantries above the carriageways) in order to warn drivers.

Thus the invention has in particular the following advantages:
it makes it possible to detect the presence of an interference phenomenon F such as fog and to carry out suitable processing CD;
it makes it possible to detect the presence of fog when the headlights PJ are in particular in the dipped position, thus avoiding automatic switching into main-beam position when this is not necessary; thus the driver will no longer be dazzled and inconvenienced by oscillations in the positions of the headlights PJ;
it makes it possible to determine the density of the fog F;
it makes it possible to determine the visibility distance DVM for the user of the vehicle V;
it is simple to implement (the determination of a region of interest and a grey-level curve and the calculation of a tangent and a directing coefficient are easy to process);
it can easily be integrated in a lighting and signalling system such as a light or headlight (camera, software/hardware) without constraining installation on the bodywork of a vehicle;
it makes it possible to anticipate the presence of fog by detecting in advance the approach of a layer of fog before the vehicle engages therein, by virtue of the change over time in the directing coefficient CF;
it makes it possible to avoid using two cameras, one for the function of detecting an interference phenomenon and one for a line detection function for example. It is possible in fact to group together two functions in a single camera that is multi-function.

While the method herein described, and the form of apparatus for carrying this method into effect, constitute preferred embodiments of this invention, it is to be understood that the invention is not limited to this precise method and form of apparatus, and that changes may be made in either without departing from the scope of the invention, which is defined in the appended claims.

What is claimed is:

1. A detection method for detecting an interference phenomenon (F) creating atmospheric interference so as to cause a loss of visibility for a user of a motor vehicle (V), comprising the steps of:
determining a region of interest (ROI) in an acquired image (I) of an environment (E) of said motor vehicle (V), said region of interest being vertical and occupying parts of said acquired image (I) on each side of a horizon line (H);
determining a grey-level curve (CL), taking into account only the median value of the grey levels of the pixels situated in said region of interest (ROI) of said acquired image (I):
wherein said detection method also comprises the steps of:
calculating at least one tangent (TG) from a point of interest (PT) in said grey-level curve (CL), said point of interest (PT) being situated above said horizon line (H);
determining a directing coefficient (CF) from said at least one tangent (TG);
deducing the presence of said interference phenomenon (F) from the value of said directing coefficient (CF) determined.

2. The detection method according to claim 1, according to which it further comprises the step of:
determining the presence of said interference phenomenon (F) according to at least one threshold value (VS) of said directing coefficient (CF).

3. The detection method according to claim 2, according to which it further comprises the step of:
determining a visibility distance (DVM) according to said directing coefficient (CF) determined.

4. The detection method according to claim 2, according to which said point of interest (PT) is a point characteristic of a start of light diffusion above a cutoff of a light beam (FX) emitted by headlights (PJ) of said motor vehicle (V) in the presence of said interference phenomenon (F).

5. The detection method according to claim 2, according to which said point of interest (PT) is the origin of said grey-level curve (CL).

6. The detection method according to claim 2, according to which said motor vehicle (V) has an angle at a steering wheel, and said region of interest (ROI) is determined in said acquired image (I) according to said angle at said steering wheel (α).

7. The detection method according to claim 1, according to which it further comprises the step of:
  determining a visibility distance (DVM) according to said directing coefficient (CF) determined.

8. The detection method according to claim 7, according to which said point of interest (PT) is a point characteristic of a start of light diffusion above a cutoff of a light beam (FX) emitted by headlights (PJ) of said motor vehicle (V) in the presence of said interference phenomenon (F).

9. The detection method according to claim 7, according to which said point of interest (PT) is the origin of said grey-level curve (CL).

10. The detection method according to claim 7, according to which said motor vehicle (V) has an angle at a steering wheel, and said region of interest (ROI) is determined in said acquired image (I) according to said angle at said steering wheel (α).

11. The detection method according to claim 1, according to which said point of interest (PT) is a point characteristic of a start of light diffusion above a cutoff of a light beam (FX) emitted by headlights (PJ) of said motor vehicle (V) in the presence of said interference phenomenon (F).

12. The detection method according to claim 11, according to which said point of interest (PT) is the origin of said grey-level curve (CL).

13. The detection method according to claim 11, according to which said motor vehicle (V) has an angle at a steering wheel, and said region of interest (ROI) is determined in said acquired image (I) according to said angle at said steering wheel (α).

14. The detection method according to claim 1, according to which said point of interest (PT) is the origin of said grey-level curve (CL).

15. The detection method according to claim 14, according to which said motor vehicle (V) has an angle at a steering wheel, and said region of interest (ROI) is determined in said acquired image (I) according to said angle at said steering wheel (α).

16. The detection method according to claim 1, according to which said motor vehicle (V) has an angle at a steering wheel, and said region of interest (ROI) is determined in said acquired image (I) according to said angle at said steering wheel (α).

17. Computer program product (PG) containing one or more sequences of instructions executable by an information processing unit, the execution of said one or more sequences of instructions allowing implementation of the method according to claim 1.

18. A device (DISP) for detecting a phenomenon (F) creating an atmospheric interference so as to cause a loss of visibility for a user of a motor vehicle (V), comprising:
  a control unit (UC) for:
    determining a region of interest (ROI) in an acquired image (I) of an environment (E) of said motor vehicle (V), said region of interest being vertical and occupying parts of said acquired image (I) on each side of a horizon line (H);
    determining a grey-level curve (CL), taking into account only the median value of the grey levels of the pixel situated in said region of interest (ROI) of lines of said acquired image (I):
  wherein, in addition, said control unit (UC):
    calculates at least one tangent (TG) from a point of interest (PT) in said grey-level curve (CL), said point of interest (PT) being situated above said horizon line (H);
    determines a directing coefficient (CF) from said at least one tangent (TG);
    deduces the presence of said phenomenon (F) from a value of a directing coefficient (CF) determined.

\* \* \* \* \*